US012025311B2

(12) United States Patent
Oskam et al.

(10) Patent No.: US 12,025,311 B2
(45) Date of Patent: Jul. 2, 2024

(54) MICROMIX FUEL INJECTION AIR NOZZLES

(71) Applicant: Solar Turbines Incorporated, San Diego, CA (US)

(72) Inventors: Gareth W. Oskam, San Diego, CA (US); Georgina J. McGee, San Diego, CA (US); Yonduck Sung, San Diego, CA (US); Gregory Michael Balow, San Diego, CA (US); Rajeshriben Patel, San Diego, CA (US); Nathan J. Kirksey, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 0 days.

(21) Appl. No.: 17/877,732

(22) Filed: Jul. 29, 2022

(65) Prior Publication Data
US 2023/0065831 A1 Mar. 2, 2023

Related U.S. Application Data

(60) Provisional application No. 63/236,618, filed on Aug. 24, 2021.

(51) Int. Cl.
*F23R 3/28* (2006.01)
*F02C 7/22* (2006.01)

(52) U.S. Cl.
CPC .............. *F23R 3/286* (2013.01); *F02C 7/222* (2013.01)

(58) Field of Classification Search
CPC .. F23R 3/286; F23R 3/28; F23R 3/283; F23D 14/58; F23D 14/64
See application file for complete search history.

(56) References Cited

U.S. PATENT DOCUMENTS

| 4,815,966 | A |   | 3/1989 | Janssen |
| 5,675,971 | A | * | 10/1997 | Angel ............... F23R 3/286 60/737 |
| 5,822,992 | A | * | 10/1998 | Dean ................ F23R 3/28 60/737 |
| 6,141,967 | A | * | 11/2000 | Angel ............... F23R 3/14 60/737 |
| 6,857,261 | B2 |   | 2/2005 | Wilson et al. |

(Continued)

FOREIGN PATENT DOCUMENTS

| GB | 974727 A | 11/1964 |
| WO | 2008091307 A2 | 7/2008 |
| WO | 2017091318 A1 | 6/2017 |

OTHER PUBLICATIONS

Written Opinion and International Search Report for Int'l. Patent Appln. No. PCT/US2022/40019, dated Dec. 29, 2022 (16 pgs).

*Primary Examiner* — William H Rodriguez

(57) ABSTRACT

Known micromixers for fuel injection (e.g., in a gas turbine engine) experience early burning or have limited operability. Accordingly, a micromixer is disclosed that utilizes an air nozzle, in combination with one or more fuel jets, to produce short flames that minimize the emission of nitrogen oxides, while providing additional benefits, such as mechanical robustness, aerodynamic efficiency, resistance to flame damage, suitability for additive manufacturing, wider operating ranges, operation with a variety of gaseous fuels, and/or amenability to control using conventional mechanisms.

10 Claims, 8 Drawing Sheets

(56) References Cited

U.S. PATENT DOCUMENTS

| | | |
|---|---|---|
| 9,651,259 B2 | 5/2017 | Boardman et al. |
| 9,862,498 B2 | 1/2018 | Wells et al. |
| 10,634,099 B2 | 4/2020 | Hampson et al. |
| 10,634,356 B2 | 4/2020 | Horikawa et al. |
| 10,775,047 B2 | 9/2020 | Horikawa et al. |
| 2007/0193273 A1* | 8/2007 | DeVane ................. F23R 3/002 60/740 |
| 2012/0073302 A1* | 3/2012 | Myers .................... F23R 3/343 239/399 |
| 2012/0258409 A1 | 10/2012 | Mansour et al. |
| 2013/0104554 A1* | 5/2013 | Bode ...................... F23R 3/286 60/740 |
| 2013/0219903 A1 | 8/2013 | Koizumi et al. |
| 2023/0204214 A1* | 6/2023 | Giridharan ............. F23R 3/286 60/737 |
| 2023/0243503 A1* | 8/2023 | Chon ..................... F23R 3/283 60/734 |

\* cited by examiner

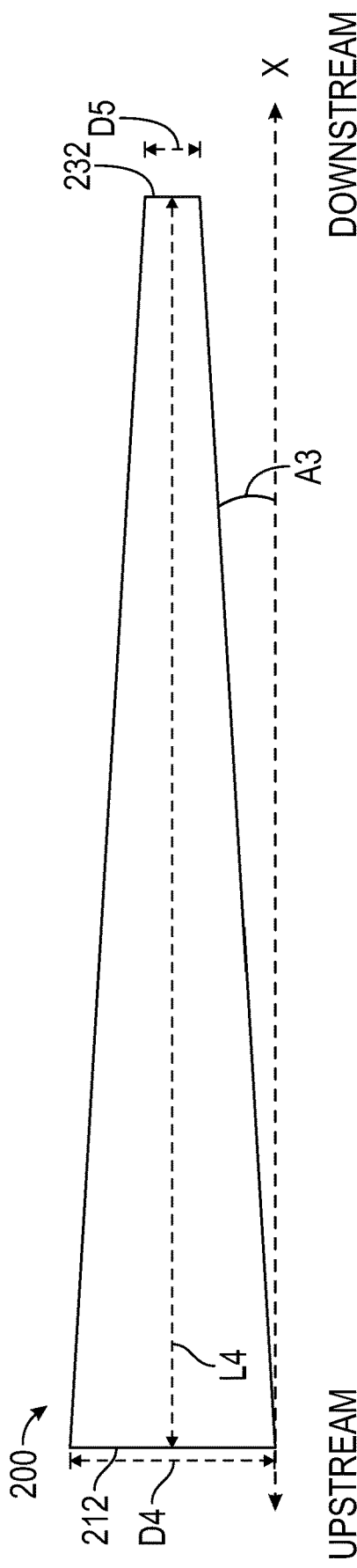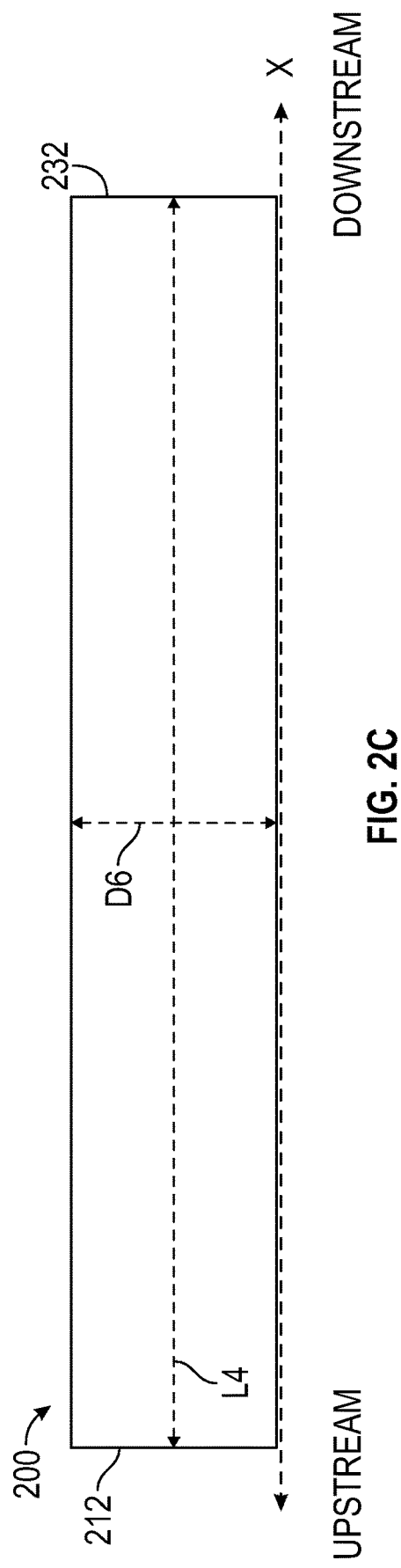

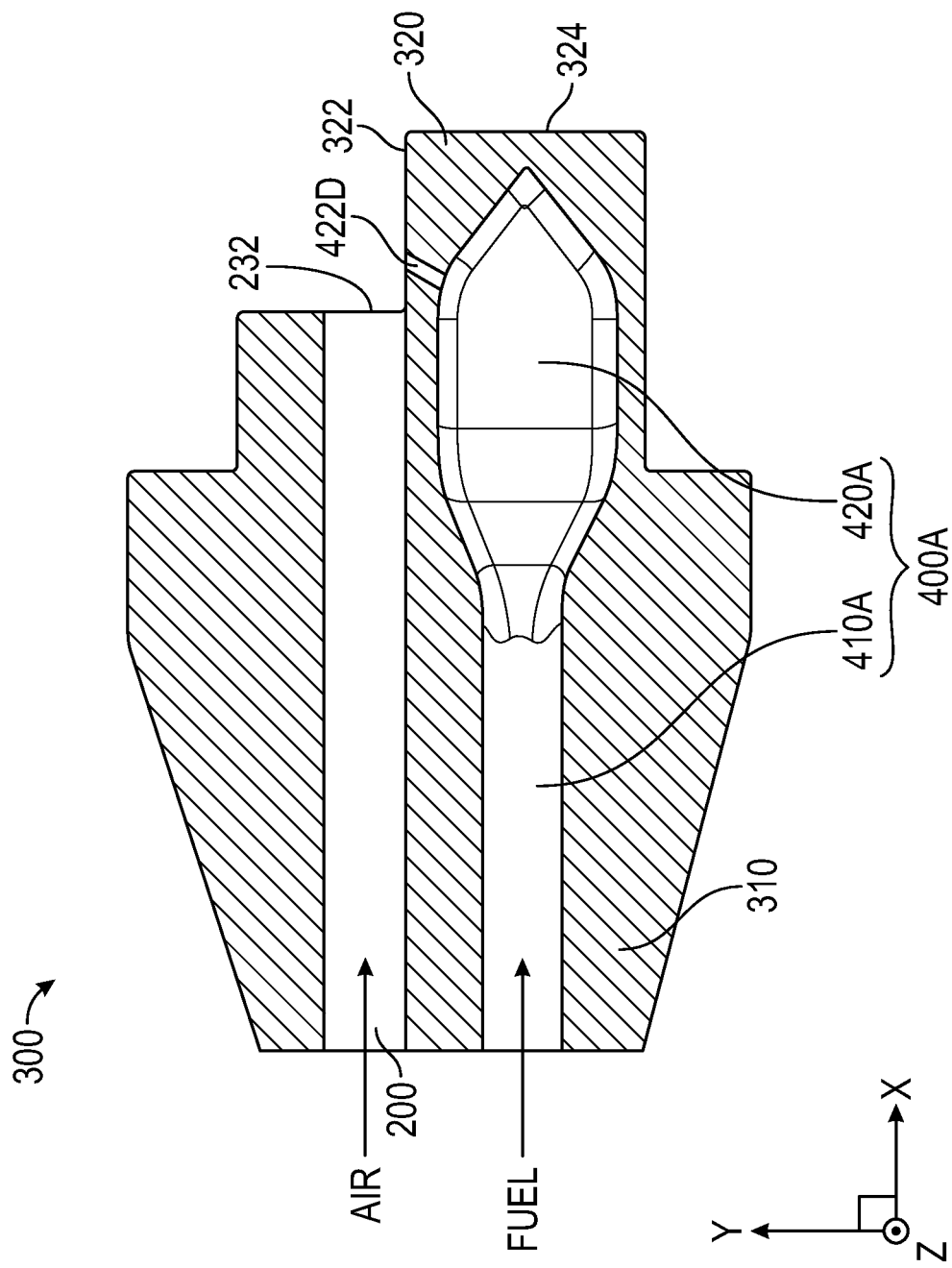

MICROMIX FUEL INJECTION AIR NOZZLES

CROSS-REFERENCE TO RELATED APPLICATIONS

The present application claims priority to U.S. Provisional Patent Application No. 63/236,618, filed on Aug. 24, 2021, which is hereby incorporated herein by reference as if set forth in full.

TECHNICAL FIELD

The embodiments described herein are generally directed to fuel injection, and, more particularly, to a micromix fuel injection air nozzle or "micromixer."

BACKGROUND

Lean premix combustion is used to achieve low emissions of nitrogen oxides in gas turbine engines that burn hydrocarbon fuels. However, lean premix combustion has limited usefulness for fuels that contain high concentrations of hydrogen, since there is a high risk of burning occurring in the mixing duct of the fuel injector. Early burning can cause high emissions of nitrogen oxides and damage the fuel injector.

A micromixer is able to produce low nitrogen oxide emissions, even with fuels containing more than 60-80% hydrogen by volume, by creating very short flames. Short flames complete combustion in a very short timescale, thereby limiting the formation of nitrogen oxide. A micromixer utilizes small dimensions and carefully positioned fuel injection to achieve the desired flame characteristics.

Known micromixers either utilize air flowing through sharp-edged orifices with downstream fuel jets, or small passages with fuel injection within the small passages to create a premixed fuel and air mixture, or miniature swirl pots with air and fuel introduced in a manner that induces a swirling motion and premixing in the combined flow, or miniature swirl fuel injectors. U.S. Pat. No. 10,634,356 is an example of a micromixer that utilizes small passages to create a premixed fuel and air mixture. However, some of these micromixers can experience early burning, while others can have limited operability. These weaknesses must be accommodated by limiting the fuel composition, limiting the strength of the air and fuel mixture, creating complex arrays and firing patterns for use in combustor geometries, and/or limiting the range of operation of the gas turbine engine in low-emission mode.

The present disclosure is directed toward overcoming one or more of the problems discovered by the inventors.

SUMMARY

In an embodiment, a micromixer comprises: a main body that includes an air nozzle defining a flow path through the main body along a first axis, the air nozzle comprising an outlet; a step extending from the main body along the first axis, the step comprising a surface that extends in a downstream direction from the outlet of the air nozzle; and a fuel supply that includes a fuel chamber, extending into the step, and one or more fuel jets that provide fluid communication between the fuel chamber and the flow path.

In an embodiment, a fuel-injection manifold comprises: a main body that includes a plurality of air nozzles that each defines a flow path along a first axis and comprises an outlet, wherein the plurality of air nozzles are arranged in one or more rows along a second axis and one or more columns along a third axis that is orthogonal to the second axis; and for each of the one or more rows, a fuel supply that includes a fuel chamber that extends along the second axis, and for each of the plurality of air nozzles in that row, at least one fuel jet that provides fluid communication between the fuel chamber and the flow path defined by that air nozzle.

In an embodiment, a gas turbine engine comprises: a compressor; a combustor downstream from the compressor, wherein the combustor includes one or more fuel injectors, and wherein each of the one or more fuel injectors includes a manifold that comprises a a main body that includes a plurality of air nozzles that each defines a flow path along a first axis and comprises an outlet, wherein the plurality of air nozzles are arranged in one or more rows along a second axis and one or more columns along a third axis that is orthogonal to the second axis, and for each of the one or more rows, a fuel supply that includes a fuel chamber that extends along the second axis, and for each of the plurality of air nozzles in that row, at least one fuel jet that provides fluid communication between the fuel chamber and the flow path defined by that air nozzle; and a turbine downstream from the combustor.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which:

FIGS. 2A-2C illustrate a cross-sectional view representing the general profile of an air nozzle, according to alternative embodiments;

FIGS. 3A and 3B illustrate a cross-sectional view of an example micromixer, according to alternative embodiments;

DETAILED DESCRIPTION

Figure 1:
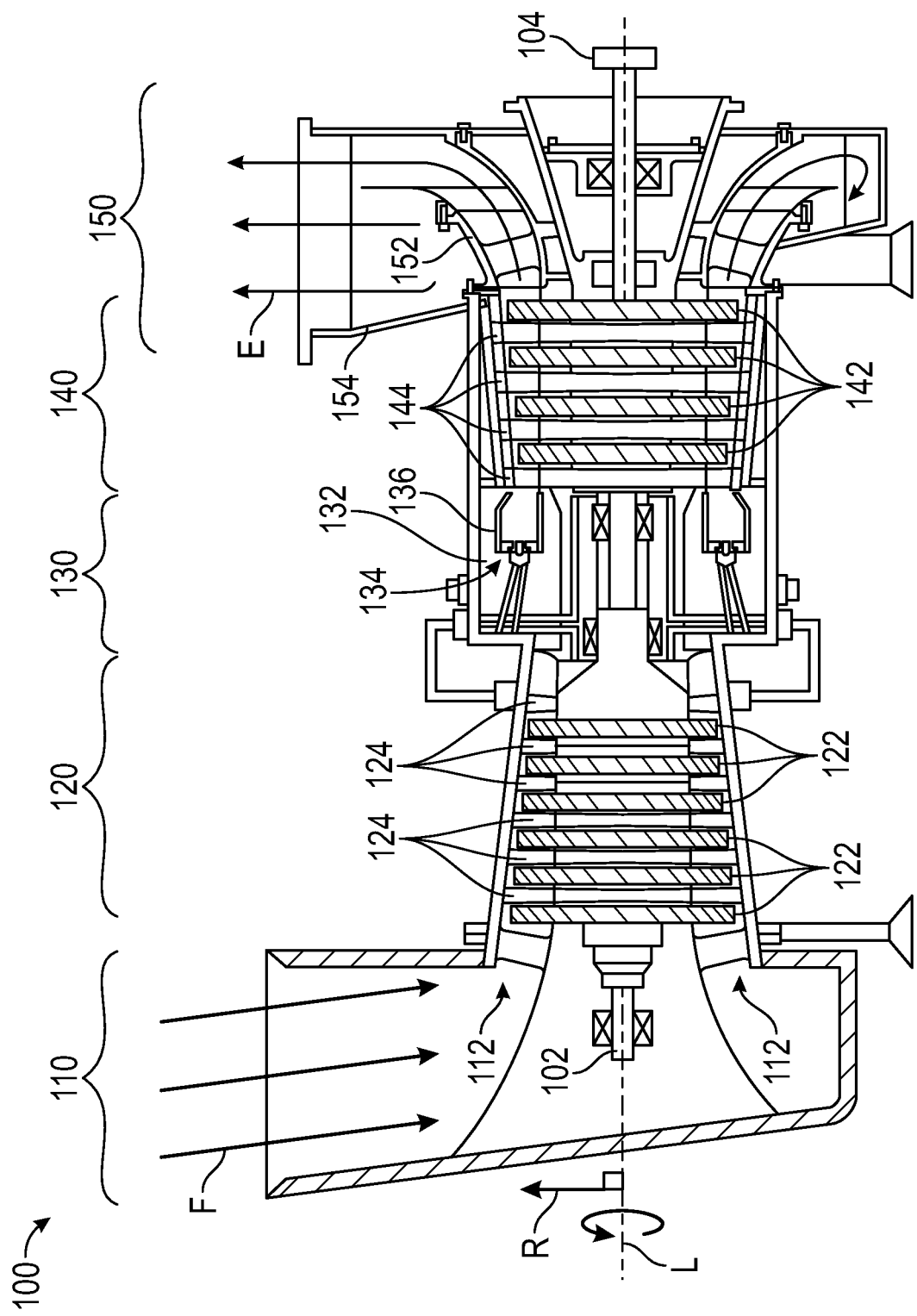
FIG. 1 illustrates a schematic diagram of a gas turbine engine, according to an embodiment.

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details. In some instances, well-known structures and components are shown in simplified form for brevity of description.

For clarity and ease of explanation, some surfaces and details may be omitted in the present description and figures. In addition, references herein to "upstream" and "downstream" or "forward" and "aft" are relative to the flow direction of the primary gas (e.g., air) used in the combustion process, unless specified otherwise. It should be understood that "upstream," "forward," and "leading" refer to a position that is closer to the source of the primary gas or a direction towards the source of the primary gas, and "downstream," "aft," and "trailing" refer to a position that is farther from the source of the primary gas or a direction that is away from the source of the primary gas. Thus, a trailing edge or end of a component (e.g., an air nozzle, micromixer, or manifold) is downstream from a leading edge or end of the same component. Also, it should be understood that, as used herein, the terms "side," "top," "bottom," "front," "rear," "above," "below," and the like are used for convenience of understanding to convey the relative positions of various components with respect to each other, and do not imply any specific orientation of those components in absolute terms (e.g., with respect to the external environment or the ground).

It should also be understood that the various components illustrated herein are not necessarily drawn to scale. In other words, the features disclosed in various embodiments may be implemented using different relative dimensions within and between components than those illustrated in the drawings.

FIG. 1 illustrates a schematic diagram of a gas turbine engine 100, according to an embodiment. Gas turbine engine 100 comprises a shaft 102 with a central longitudinal axis L. A number of other components of gas turbine engine 100 are concentric with longitudinal axis L and may be annular to longitudinal axis L. A radial axis may refer to any axis or direction that radiates outward from longitudinal axis L at a substantially orthogonal angle to longitudinal axis L, such as radial axis R in FIG. 1. Thus, the term "radially outward" should be understood to mean farther from or away from longitudinal axis L, whereas the term "radially inward" should be understood to mean closer or towards longitudinal axis L. As used herein, the term "axial" will refer to any axis or direction that is substantially parallel to longitudinal axis L.

In an embodiment, gas turbine engine 100 comprises, from an upstream end to a downstream end, an inlet 110, a compressor 120, a combustor 130, a turbine 140, and an exhaust outlet 150. In addition, the downstream end of gas turbine engine 100 may comprise a power output coupling 104. One or more, including potentially all, of these components of gas turbine engine 100 may be made from stainless steel and/or durable, high-temperature materials known as "superalloys." A superalloy is an alloy that exhibits excellent mechanical strength and creep resistance at high temperatures, good surface stability, and corrosion and oxidation resistance. Examples of superalloys include, without limitation, Hastelloy, Inconel, Waspaloy, Rene alloys, Haynes alloys, Incoloy, MP98T, TMS alloys, and CMSX single crystal alloys.

Inlet 110 may funnel a working fluid F (e.g., the primary gas, such as air) into an annular flow path 112 around longitudinal axis L. Working fluid F flows through inlet 110 into compressor 120. While working fluid F is illustrated as flowing into inlet 110 from a particular direction and at an angle that is substantially orthogonal to longitudinal axis L, it should be understood that inlet 110 may be configured to receive working fluid F from any direction and at any angle that is appropriate for the particular application of gas turbine engine 100. While working fluid F will primarily be described herein as air, it should be understood that working fluid F could comprise other fluids, including other gases.

Compressor 120 may comprise a series of compressor rotor assemblies 122 and stator assemblies 124. Each compressor rotor assembly 122 may comprise a rotor disk that is circumferentially populated with a plurality of rotor blades. The rotor blades in a rotor disk are separated, along the axial axis, from the rotor blades in an adjacent disk by a stator assembly 124. Compressor 120 compresses working fluid F through a series of stages corresponding to each compressor rotor assembly 122. The compressed working fluid F then flows from compressor 120 into combustor 130.

Combustor 130 may comprise a combustor case 132 that houses one or more, and generally a plurality of, fuel injectors 134. In an embodiment with a plurality of fuel injectors 134, fuel injectors 134 may be arranged circumferentially around longitudinal axis L within combustor case 132 at equidistant intervals. Combustor case 132 diffuses working fluid F, and fuel injector(s) 134 inject fuel into working fluid F. This injected fuel is ignited to produce a combustion reaction in one or more combustion chambers 136. The product of the combustion reaction drives turbine 140.

Turbine 140 may comprise one or more turbine rotor assemblies 142 and stator assemblies 144 (e.g., nozzles). Each turbine rotor assembly 142 may correspond to one of a plurality or series of stages. Turbine 140 extracts energy from the combusting fuel-gas mixture as it passes through each stage. The energy extracted by turbine 140 may be transferred via power output coupling 104 (e.g., to an external system), as well as to compressor 120 via shaft 102.

The exhaust E from turbine 140 may flow into exhaust outlet 150. Exhaust outlet 150 may comprise an exhaust diffuser 152, which diffuses exhaust E, and an exhaust collector 154 which collects, redirects, and outputs exhaust E. It should be understood that exhaust E, output by exhaust collector 154, may be further processed, for example, to reduce harmful emissions, recover heat, and/or the like. In addition, while exhaust E is illustrated as flowing out of exhaust outlet 150 in a specific direction and at an angle that is substantially orthogonal to longitudinal axis L, it should be understood that exhaust outlet 150 may be configured to output exhaust E towards any direction and at any angle that is appropriate for the particular application of gas turbine engine 100.

Figure 2A:
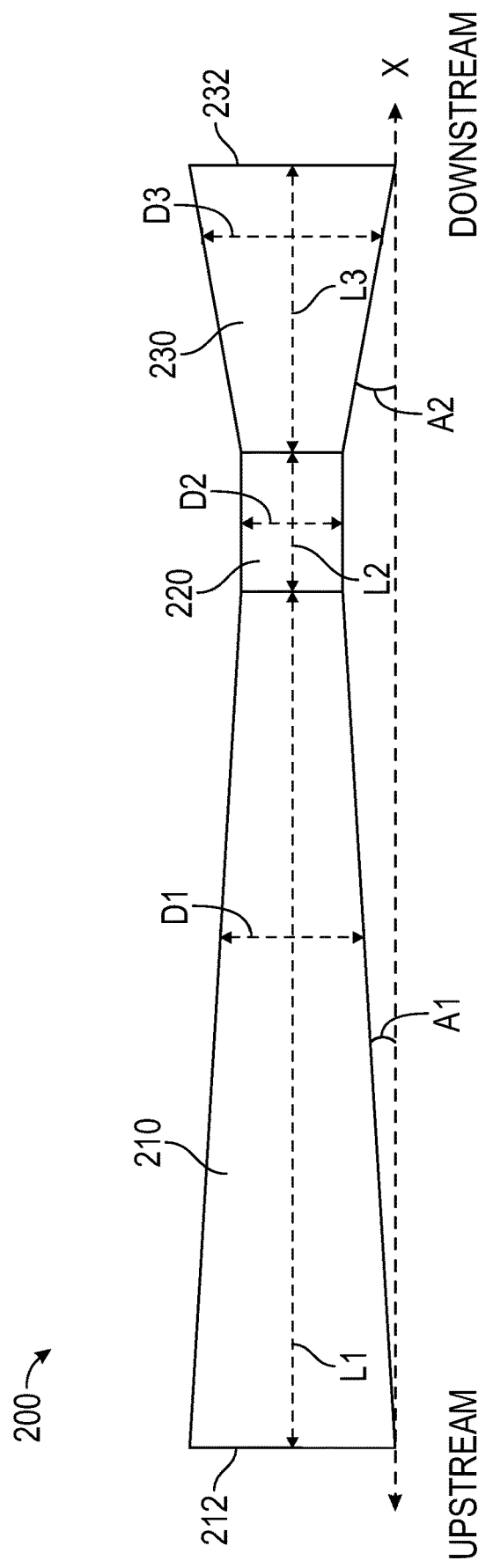

FIG. 2A illustrates a cross-sectional view representing the general profile of a flow path through an air nozzle 200, according to a first embodiment. Air nozzle 200 comprises an inlet portion 210 providing an inlet 212 for air on an upstream end of air nozzle 200, a throat portion 220 extending downstream from inlet portion 210, and an outlet portion 230 extending downstream from throat portion 220 and providing an outlet 232 on the downstream end of air nozzle 200. Air nozzle 200, including inlet portion 210, throat portion 220, and outlet portion 230, is hollow and defines a flow path for air. The flow path may consist of a single contiguous flow path with no internal obstructions. While inlet portion 210, throat portion 220, and outlet portion 230 are illustrated as distinct sections, it should be understood that air nozzle 200 may be manufactured as a single, integral component. Alternatively, air nozzle 200 could be manufactured as separate components (e.g., a separate inlet portion 210, throat portion 220, and outlet portion 230) which are subsequently assembled into a single, composite component. In addition, while throat portion 220 is illustrated between inlet 210 and outlet portion 230, in an alternative embodiment, throat portion 220 may have minimum length, as determined by the method of manufacture, such that outlet portion 230 extends directly from inlet portion 210.

In an embodiment, inlet portion 210 contracts or converges in the downstream direction. In other words, the cross-sectional area of inlet portion 210, in a plane that is orthogonal to the X axis, decreases in the downstream direction. Thus, as shown, the distance D1 decreases in the downstream direction. In an embodiment, inlet portion 210 is a conical frustum, such that the cross-section of inlet portion 210, in a plane that is orthogonal to the X axis, is circular. In this case, distance D1 is the diameter of inlet portion 210. In an alternative embodiment, the cross-section of inlet portion 210, in a plane that is orthogonal to the X axis, may be elliptical, square, rectangular, or have another non-circular profile. In this case, the cross-sectional area of inlet portion 210 may decrease in the downstream direction by virtue of a decrease in one or a plurality of dimensions (e.g., decreasing in height with constant width, decreasing in width with constant height, or decreasing in both height and width).

In an embodiment, throat portion 220 is substantially uniform. In other words, the cross-sectional area of throat portion 220, in a plane that is orthogonal to the X axis, is substantially constant from the upstream end to the downstream end of throat 220. Thus, as shown, the distance D2 remains the same from the upstream end to the downstream end. In an embodiment, throat portion 220 is a cylinder, such that the cross-section of throat portion 220, in a plane that is orthogonal to the X axis, is circular. In this case, distance D2 is the diameter of throat portion 220. In an alternative embodiment, the cross-section of throat portion 220, in a plane that is orthogonal to the X axis, may be elliptical, square, rectangular, or have another non-circular profile.

In an embodiment, outlet portion 230 expands or diverges in the downstream direction. In other words, the cross-sectional area of outlet portion 230, in a plane that is orthogonal to the X axis, increases in the downstream direction. Thus, as shown the distance D3 increases in the downstream direction. In an embodiment, outlet portion 230 is a conical frustum, such that the cross-section of outlet portion 230, in a plane that is orthogonal to the X axis, is circular. In this case, distance D3 is the diameter of outlet portion 230. In an alternative embodiment, the cross-section of outlet portion 230, in a plane that is orthogonal to the X axis, may be elliptical, square, rectangular, or have another non-circular profile. In this case, the cross-sectional area of outlet 230 may increase in the downstream direction by virtue of an increase in one or a plurality of dimensions (e.g., increasing in height with constant width, increasing in width with constant height, or increasing in both height and width).

In any case, the cross-sectional shape of inlet portion 210, throat portion 220, and outlet portion 230, in a plane that is orthogonal to the X axis, may be the same (e.g., circular, rectangular, such as square, etc.). For example, the entirety of air nozzle 200 may be axi-symmetric around a central axis that is parallel with the X axis. Alternatively, the cross-sectional shape of one or more of inlet portion 210, throat portion 220, and outlet portion 230 may differ from one or both of the other ones of inlet portion 210, throat portion 220, and outlet portion 230. For example, the cross-sectional shape of air nozzle 200 may comprise a circular inlet portion 210 that blends or transitions in throat 220 to a rectangular outlet portion 230.

In any case, one or more dimensions of air nozzle 200 may be adjusted as appropriate for a given application. These dimensions include, without limitation, the length L1 of inlet portion 210, the length L2 of throat portion 220, the length L3 of outlet portion 230, the contraction angle A1 of inlet portion 210, the expansion angle A2 of outlet portion 230, the distance D1 of inlet portion 210, the distance D2 of throat portion 220, the distance D3 of outlet portion 230, and/or the like. In addition, in an embodiment, inlet portion 210 may contract non-linearly (e.g., instead of at a constant angle A1) in the downstream direction according to a radius of curvature for at least a portion that transitions into the upstream end of throat portion 220 and potentially for the entire length of inlet portion 210, and/or outlet portion 230 may expand non-linearly (e.g., instead of at a constant angle A2) in the downstream direction according to a radius of curvature for at least a portion that transitions from the downstream end of throat portion 220 and potentially for the entire length of outlet portion 230. In this case, the radius of curvature of inlet portion 210 and/or the radius of curvature of outlet portion 230 may be adjusted as appropriate for the given application. For example, the curvature might be described by an ellipse or other appropriate curve (e.g., power law, logarithmic curve, parabola, etc.).

In an embodiment, the length L1 of inlet portion 210 may be long, relative to the entire length of air nozzle 200 (e.g., L1 greater than 50% of the total length L1+L2+L3), and converge at a small contraction angle A1 (e.g., 1 to 10 degrees). This can ensure that minimal pressure loss occurs from disturbances in the flow boundary layer. In addition, the length L3 of outlet portion 230 may be short, relative to the entire length of air nozzle 200 (e.g., L3 less than 30% of the total length L1+L2+L3), and diverge at a small expansion angle A2 (e.g., 5 to 20 degrees). This makes best use of the available pressure difference, while imposing control of flow direction and strength, creating and controlling recirculation regions downstream from outlet portion 230, and/or minimizing pressure loss. This may also potentially obtain some level of pressure recovery to allow the effective total or apparent discharge coefficient to be greater than 1 (e.g., up to 1.2). Notably, the length L2 of throat portion 220 may be minimized to the minimum that can be manufactured by practical methods of conventional machining or additive manufacturing. In a preferred embodiment, the length L2 of throat portion 220 is 0 to 1 times the diameter D2 or an equivalent diameter, such as the hydraulic diameter, for a throat portion 220 with a non-circular cross-section. However, in an alternative embodiment, the length L2 of throat portion 220 may be longer.

As non-limiting examples of relative dimensions, L1 may represent 45-55% of the total length (i.e., L1+L2+L3), L2 may represent 0-25% of the total length, and L3 may represent 20-35% of the total length. As another non-limiting example of relative dimensions, Distance D1 may converge from a maximum value at the upstream end that is 65-85% of the value of L1 to a minimum value at the downstream end that is 50-70% of the value of L1. As another non-limiting example of relative dimensions, in an embodiment that comprises a throat portion 220, distance D2 may have a value that is 90-160% of the value of L2. As another non-limiting example of relative dimensions, distance D3 may expand from a minimum value at the upstream end that is 90-120% of the value of L3 to a maximum value at the downstream end that is 120-150% of the value of L3.

FIG. 2B illustrates a cross-sectional view representing the general profile of a flow path through an air nozzle 200 in a first plane, according to a second embodiment. Conceptually, this second embodiment is similar to inlet portion 210 of the first embodiment, but extends a length L4 representing the entire length of the flow path, along the X axis, from inlet 212 on the upstream end to outlet 232 on the downstream end. As in the first embodiment, air nozzle 200 could be manufactured as a single, integral component, or as separate components which are subsequently assembled into a single, composite component.

In an embodiment, air nozzle 200 contracts or converges in the downstream direction. In other words, the cross-sectional area of air nozzle 200, in a plane that is orthogonal to the X axis, decreases in the downstream direction. Thus, as shown, the flow path converges from a maximum distance D4 at inlet 212 to a minimum distance D5 at outlet 232. The flow path may converge at a constant rate, such that the cross-section, in a plane that includes the X axis, is trapezoidal. In an embodiment, the flow path is a conical frustum, such that the cross-section, in a plane that is orthogonal to the X axis, is circular. In this case, distances D4 and D5 are diameters. In an alternative embodiment, the cross-section of the flow path, in a plane that is orthogonal to the X axis, may be elliptical, square, rectangular, or have another non-circular profile. In this case, the cross-sectional area of the flow path may decrease in the downstream direction by virtue of a decrease in one or a plurality of dimensions (e.g., decreasing in height with constant width, decreasing in width with constant height, or decreasing in both height and width). For example, for a rectangular profile, both the height and the width may decrease in the downstream direction.

As in the first embodiment, one or more dimensions of air nozzle 200 may be adjusted as appropriate for a given application. These dimensions include, without limitation, the length L4 of the flow path, the contraction angle A3 of the flow path, the upstream or maximum diameter D4 of the flow path, the downstream or minimum diameter D5 of the flow path, and/or the like. In addition, in an embodiment, the flow path may contract non-linearly (e.g., instead of at a constant angle A3) in the downstream direction according to a radius of curvature for at least a portion and potentially for the entire length of the flow path. In this case, the radius of curvature of the flow path may be adjusted as appropriate for the given application. For example, the curvature might be described by an ellipse or other appropriate curve (e.g., power law, logarithmic curve, parabola, etc.).

In an embodiment, the flow path may converge at a small contraction angle A3 (e.g., 1 to 10 degrees). As in the first embodiment, this can ensure that minimal pressure loss occurs from disturbances in the flow boundary layer. As non-limiting examples of relative dimensions, D5 may have a value that is 40-65% of the value of D4. As additional non-limiting examples of relative dimensions, D4 may have a value that is 40-65% of the value of L4, and D5 may have a value that is 20-35% of the value of L4.

FIG. 2C illustrates a cross-sectional view representing the general profile of a flow path through an air nozzle 200, in a second plane that is orthogonal to the first plane in FIG. 2B, according to an implementation of the second embodiment. In this implementation of the second embodiment of air nozzle 200, the flow path is a trapezoidal prism, such that the cross-section, in a plane that is orthogonal to the X axis, is rectangular, and the cross-sectional area decreases in only one dimension (e.g., height or width). In an embodiment, the top and bottom surfaces of air nozzle 200 are trapezoidal as illustrated in FIG. 2B, whereas the side surfaces of air nozzle 200 are rectangular as illustrated in FIG. 2C. In an alternative embodiment, the top and bottom surfaces of air nozzle 200 may be rectangular as illustrated in FIG. 2C, whereas the side surfaces of air nozzle 200 are trapezoidal as illustrated in FIG. 2B. In yet another alternative embodiment, the top, bottom, and both side surfaces of air nozzle 200 may all be trapezoidal as illustrated in FIG. 2B or may all be rectangular as illustrated in FIG. 2C.

Figure 3A:
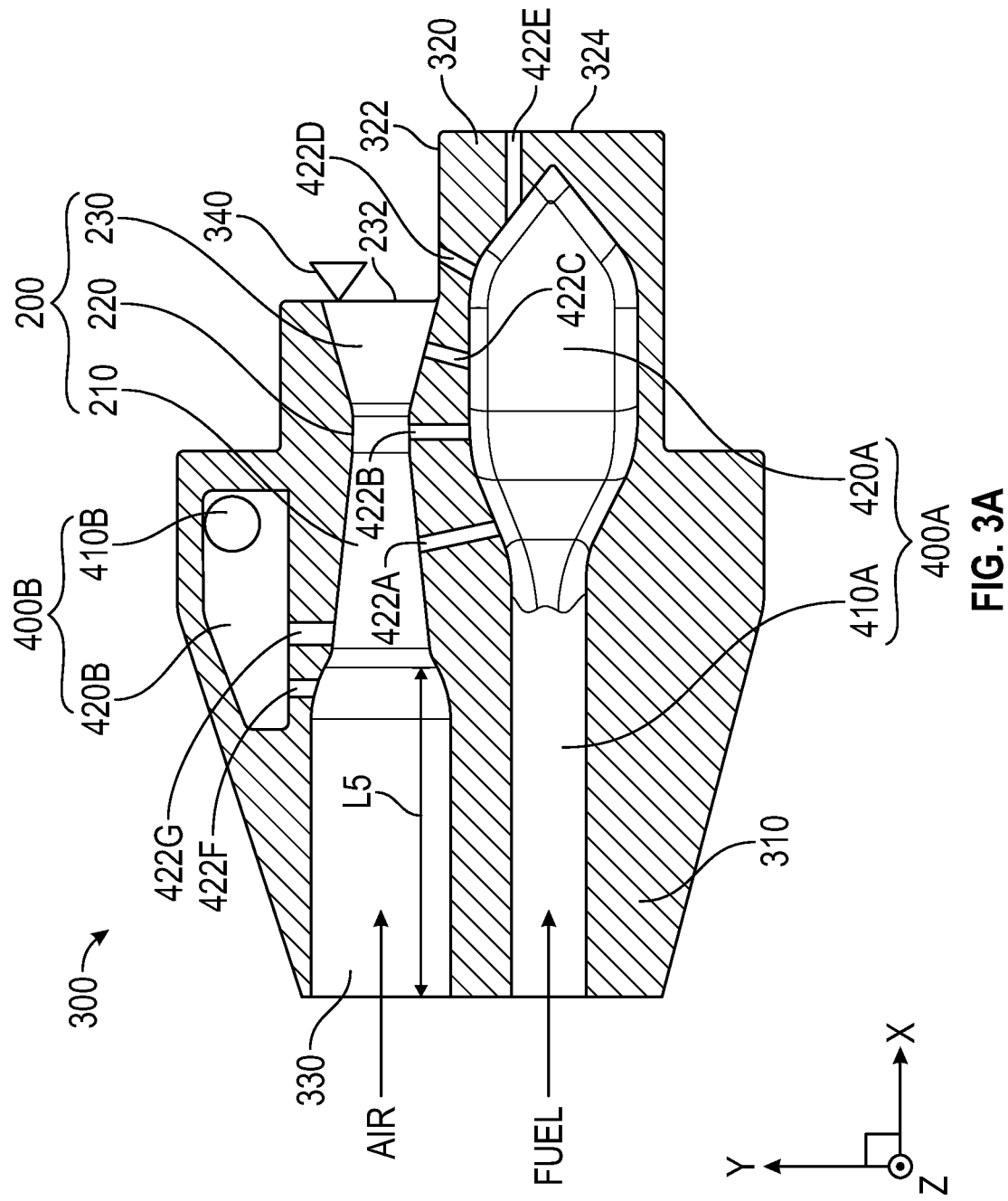

FIG. 3A illustrates a cross-sectional view of an example micromixer 300, according to a first embodiment. Micromixer 300 will be described with respect to X, Y, and Z axes. It should be understood that the Z axis is orthogonal to both the X and Y axes, such that it would extend orthogonally through the drawing sheet in FIG. 3A.

As illustrated, micromixer 300 comprises a main body 310 and a step 320. Micromixer 300 also comprises an air nozzle 200 within main body 310, defining a flow path for air through main body 310. Micromixer 300 also comprises a fuel supply 400A that extends through main body 310 and partially into step 320. In an alternative embodiment, step 320 may be omitted, such that fuel supply 400A is fully contained within main body 310 and does not extend farther downstream than outlet 232 of air nozzle 200. Micromixer 300 may also comprise an entry channel 330 with a length L5 that provides a flow path to inlet portion 210 of air nozzle 200. The length L5 of entry channel 330 may be long or short, or entry channel 330 may be omitted altogether (i.e., L5=0). As illustrated, in an embodiment comprising entry channel 330, the profile of the transition between the downstream end of entry channel 330 and the upstream end of inlet 210 may comprise curved edges to further suppress boundary layer effects, such as flow separation, which can reduce the control of flow.

Fuel supply 400 comprises at least one fuel channel 410 and a fuel chamber 420. In the illustrated embodiment, micromixer 300 comprises two fuel supplies 400A and 400B, with fuel supply 400A comprising a fuel channel 410A and a fuel chamber 420A and fuel supply 400B comprising fuel channel 410B and fuel chamber 420B. In an alternative embodiment, micromixer 300 may consist of only a single fuel supply 400 (e.g., 400A or 400B). Each fuel chamber 420 (e.g., 420A and 420B) is in fluid communication with one or more fuel jets 422. A plurality of fuel jets 422A, 422B, 422C, 422D, 422E, 422F, and 422G are illustrated to represent various potential locations of fuel jet 422. It should be understood that embodiments do not necessarily need to comprise all of fuel jets 422A-422G, and, in an embodiment, fuel chamber 420A consists of only one of fuel jets 422A-422E and/or fuel chamber consists of only one of fuel jets 422F and 422G. It should also be understood that fuel jet(s) 422 may be positioned in locations other than the locations illustrated by fuel jets 422A-422E. Fuel jets 422A-422E are merely included to represent different possible relationships between fuel chamber 420A and air nozzle 200. In particular, fuel jet 422A is positioned between and fluidly connects an upstream end of fuel chamber 420A and inlet portion 210, fuel jet 422B is positioned between and fluidly connects a middle portion of fuel chamber 420A and throat portion 220, fuel jet 422C is positioned between and fluidly connects a middle portion of fuel chamber 420A and outlet portion 230, fuel jet 422D is positioned between and fluidly connects a downstream end of fuel chamber 420A and a surface 322 of step 320 that extends downstream from outlet 232 along the X axis, and fuel jet 422E is positioned between and fluidly connects a downstream end of fuel chamber 420A and a surface 324 of step 320 that extends orthogonally from surface 322 along the Y axis. Generally speaking, each fuel jet 422A-422E provides fluid communication between fuel chamber 420A and the flow path for air defined by air nozzle 200. Similarly, fuel jet 422F and fuel jet 422G are positioned between and fluidly connect fuel chamber 420B and inlet portion 210, thereby providing an alternate fuel injection location that may be advantageous in certain circumstances (e.g., when injecting a fuel not containing hydrogen). Fuel supply 400B provides a means to inject a supplementary gaseous fuel when the need arises.

Air flows along the X axis into inlet portion 210, through throat portion 220, and out of outlet 232 of outlet portion 230, from the upstream end to the downstream end. At the same time, fuel may flow along the X axis through fuel channel 410A into fuel chamber 420A and out of fuel jet(s) 422. Thus, the air flow will pass over an orifice of each fuel jet 422 as fuel is exiting the orifice, thereby resulting in the injection of fuel into the air stream. It should be understood that, if micromixer 300 comprises fuel jet 422A, the air and fuel will begin mixing in inlet portion 210. If micromixer 300 comprises fuel jet 422B, the air and fuel will begin mixing in throat portion 220. If micromixer 300 comprises fuel jet 422C, the air and fuel will begin mix in outlet portion 230. If micromixer 300 comprises fuel jet 422D, the air and fuel will begin mixing externally and downstream from outlet 232. If micromixer 300 comprises fuel jet 422E, the air and fuel will mix externally and farther downstream from outlet 232. While each fuel supply 400 is illustrated in a particular position with respect to air nozzle 200 and in a particular configuration, each fuel supply 400 may be implemented in a different position with respect to air nozzle 200 and/or in a different configuration, as long as one or more fuel jets 422 inject fuel into the flow path through air nozzle 200.

In an embodiment, one or more fuel jets 422 may be oriented in the direction of air flow through air nozzle 200. For example, a fuel jet 422 may be angled downstream, such that the first end and inlet of fuel jet 422 connects to fuel chamber 420 at a position that is upstream from the position of the opposing second end and outlet of fuel jet 422. Fuel jets 422C, 422D, and 422E are each an example of a fuel jet 422 that is angled downstream. As a non-limiting example, the angle of a fuel jet 422 (e.g., 422D), with respect to the X axis, may be 35-55 degrees. Angling fuel jet 422 downstream in the direction of air flow can be used to initiate the mixing process in a location and at a rate that is beneficial to the overall formation of a flame by controlling the rate of mixing between the fuel and the air flow. Ideally, the flame will not be initiated from any solid surface, thereby minimizing the heating of the surface. Rather, ideally, the flame will initiate and stabilize close to, but detached from, the solid surface due to the combined effects of turbulence and flame speed. Such stabilization is subject to operating conditions, in addition to the physical design.

Some embodiments may benefit from or require additional turbulence generators to create stable turbulent zones, away from the solid surfaces, to enable certain fuels— such as methane or natural gases, which have slower flame speeds than, for example, hydrogen and blends of hydrogen and hydrocarbon gases—to ignite and stabilize. Thus, in an embodiment, a turbulence-generating or flame-holding body 340 may be included at or near outlet 232 to impose a turbulent region within the air flow or air-fuel flow efflux, so that the flame may stabilize. While body 340 is illustrated as having a substantially triangular profile, positioned orthogonally to axis X, it should be understood that body 340 may have other shapes, locations, and orientations (e.g., substantially orthogonal or parallel to axis X).

FIG. 3B illustrates a cross-sectional view of an example micromixer 300, according to a second embodiment. The primary difference between the second embodiment and the first embodiment of micromixer 300 is that the second embodiment incorporates air nozzle 200 from FIGS. 2B and 2C, whereas the first embodiment incorporates air nozzle 200 from FIG. 2A. In particular, air nozzle 200 in this second embodiment of micromixer 300 comprises trapezoidal top and bottom surfaces (i.e., in X-Z planes) and rectangular side surfaces (i.e., in X-Y planes). In an alternative embodiment, air nozzle 200 in this second embodiment of micromixer 300 may comprise trapezoidal side surfaces (i.e., in X-Y planes) and rectangular top and bottom surfaces (i.e., in X-Z planes). In all other respects, the second embodiment of micromixer 300 may be identical to the first embodiment of micromixer 300. However, in the illustrated second embodiment, fuel supply 400B and flame-holding body 340 have been omitted. In addition, only a single fuel jet 422D is illustrated. Fuel jet 422D is positioned between and fluidly connects a downstream end of fuel chamber 420A and a surface 322 of step 320 that extends downstream from outlet 232 of air nozzle 200 along the X axis. As an example, fuel jet 422D may be angled at 35-55 degrees with respect to the X axis and/or positioned 0.0-0.4 inches downstream from outlet 232 of air nozzle 200.

Figure 4A:
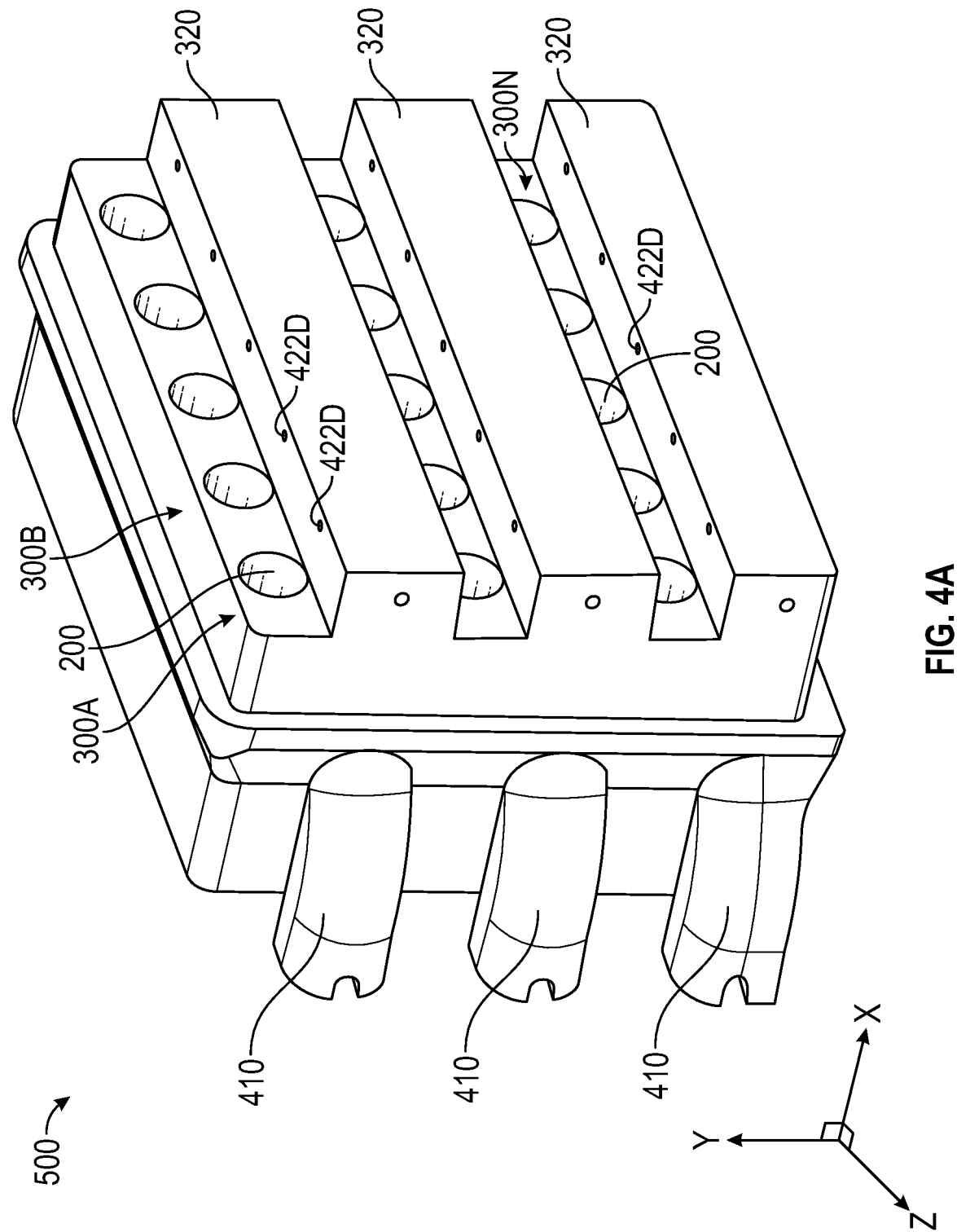
FIGS. 4A and 4B illustrate a perspective view of an example manifold comprising a plurality of micromixers, according to alternative embodiments.
Figure 5A:
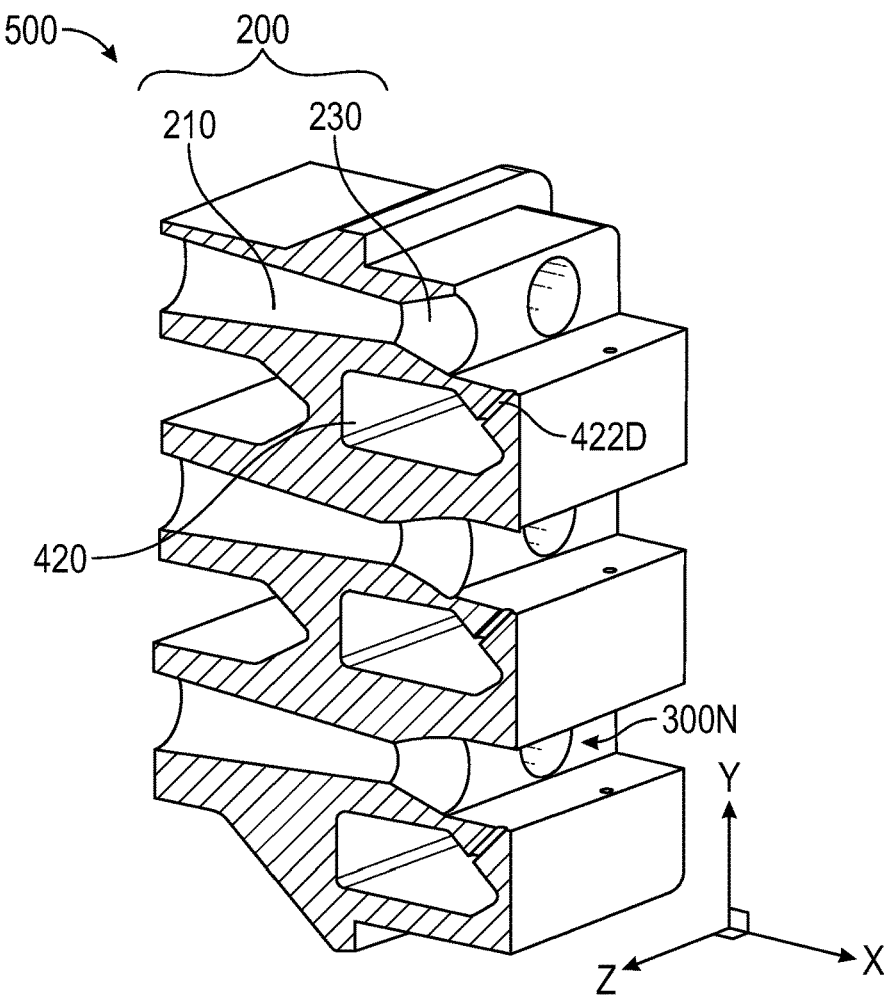
FIGS. 5A and 5B illustrate a perspective, cross-sectional view of an example manifold comprising a plurality of micromixers, according to alternative embodiments.

FIG. 4A illustrates a perspective view of an example manifold 500 comprising a plurality of micromixers 300 (e.g., 300A, 300B, 300N), and FIG. 5A illustrates a perspective, cross-sectional view of the same manifold 500, according to a first embodiment. In particular, micromixers 300 may be combined in rows along the Z axis and/or in columns along the Y axis. In the illustrated embodiment, micromixers 300 are combined in both rows and columns. While three rows and five columns are illustrated, it should be understood that manifold 500 may comprise any number of rows and any number of columns of micromixers 300, including one or a plurality of rows and one or a plurality of columns. It should also be understood that the number of rows may be the same or different as the number of columns. The terms "rows" and "columns" should not be understood to require manifold 500 to have a certain orientation. Rather, these terms simply convey that micromixers 300 may be arranged in a two-dimensional pattern (e.g., along the X and Y axes). While a grid pattern is illustrated, micromixers 300 may be arranged in any two-dimensional pattern that is suitable for the application.

In manifold 500, a single fuel channel 410 may be provided for each row of micromixers 300. In this case, fuel channel 410 may supply a single fuel chamber 420 that provides fuel injection for an entire row of air nozzles 200. In other words, each row of micromixers may share a single fuel chamber 420. In particular, each fuel chamber 420 may extend along the Z axis (e.g., within step 320) to supply one or more fuel jets 422 for each air nozzle 200. In the illustrated embodiment, each micromixer 300 comprises a single fuel jet 422D in step 320. However, it should be understood that each micromixer 300 may consist of a differently positioned fuel jet 422 (e.g., 422A, 422B, 422C, 422E) and/or a configuration of a plurality of fuel jets 422.

Notably, in the embodiment illustrated in FIGS. 4A and 5A, air nozzle 200 includes a throat portion 220 that has a minimal length L2, as determined by the method of manufacture. In particular, in the illustrated example, length L2 is zero or near zero, such that throat portion 220 is practically omitted. Thus, air will flow through each inlet portion 210 and into and out of each outlet portion 230 in manifold 500. Simultaneously, for each row of micromixers 300, fuel will flow through fuel channel 410 into a fuel chamber 420 for the row. When entering each fuel chamber 420, the fuel will flow along the Z axis to supply fuel to each fuel jet 422 (e.g., fuel jet 422D) for each air nozzle 200. The fuel will flow out of each fuel jet 422 to mix with the air stream in the flow path defined by each air nozzle 200.

Figure 4B:
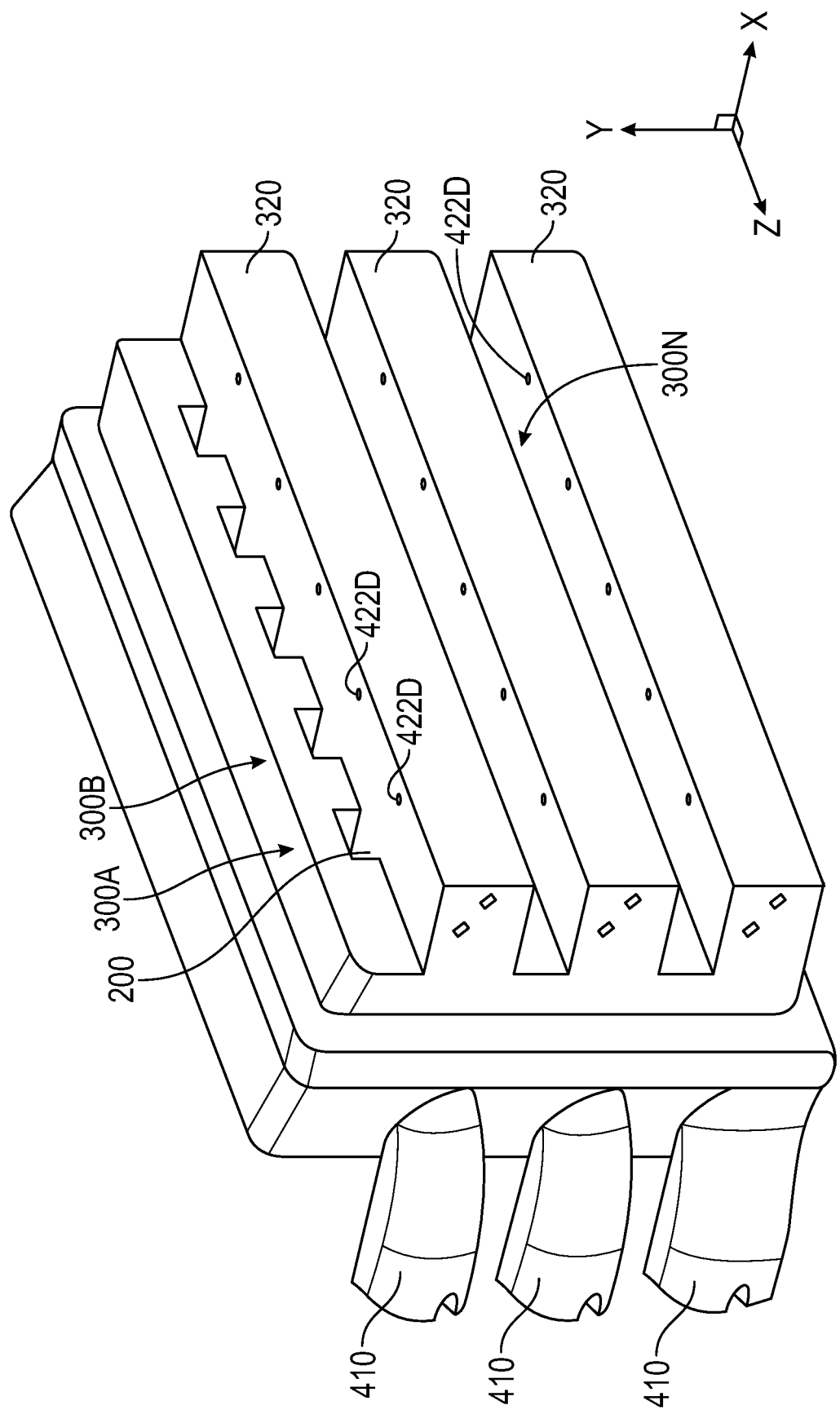
Figure 5B:
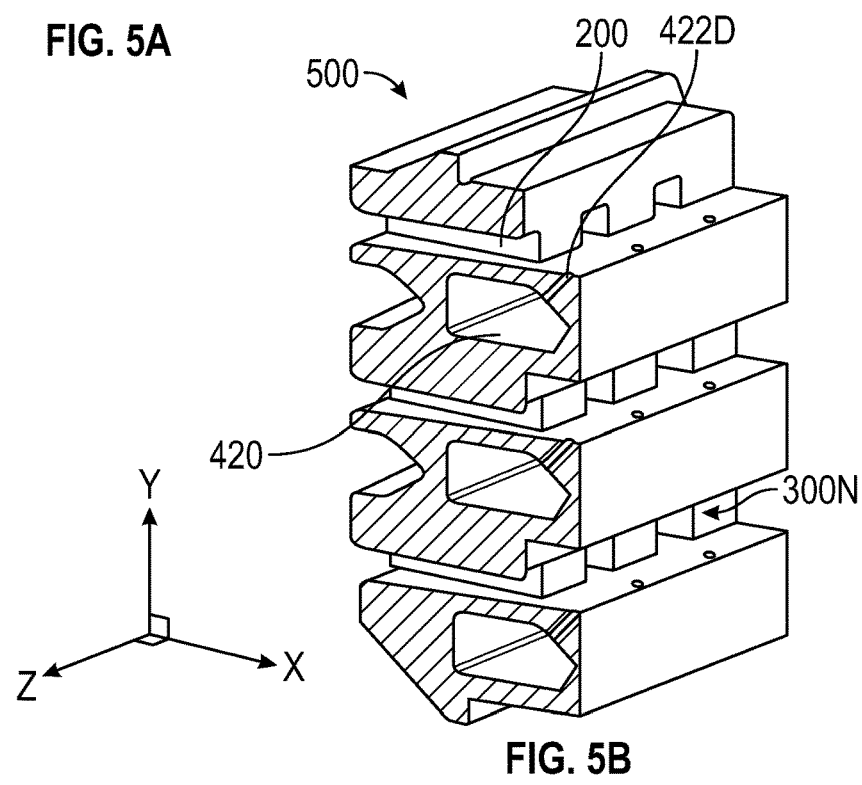

FIG. 4B illustrates a perspective view of an example manifold 500 comprising a plurality of micromixers 300 (e.g., 300A, 300B, 300N), and FIG. 5B illustrates a perspective, cross-sectional view of the same manifold 500, according to a second embodiment. The primary difference between the second embodiment and the first embodiment of manifold 500 is that the second embodiment incorporates air nozzle 200 from FIGS. 2B and 2C, whereas the first embodiment incorporate air nozzle 200 from FIG. 2A. In particular, air nozzle 200 in this second embodiment of manifold 500 comprises trapezoidal top and bottom surfaces (i.e., in X-Z planes) and rectangular side surfaces (i.e., in X-Y planes). In an alternative embodiment, air nozzle 200 in this second embodiment of manifold 500 may comprise trapezoidal side surfaces (i.e., in X-Y planes) and rectangular top and bottom surfaces (i.e., in X-Z planes). In all other respects, the second embodiment of micromixer 300 may be identical to the first embodiment of micromixer 300. In all other respects, the second embodiment of manifold 500 may be identical to the first embodiment of manifold 500. It should be understood that manifold 500 could be similarly adapted to incorporate air nozzle 200 from FIG. 2C.

INDUSTRIAL APPLICABILITY

Micromixers 300 (e.g., incorporated into one or a plurality of manifolds 500) may be used in fuel injectors 134 in combustor 130 of gas turbine engine 100. Each micromixer 300 may comprise an air nozzle 200 with a converging inlet 210 and diverging outlet 230 (with or without a throat 220), a trapezoidal profile that converges in the downstream direction in one or more dimensions, a rectangular profile with a constant cross-sectional area, or the like. Micromixers 300 produce short flames that minimize the emission of nitrogen oxides. In addition, micromixers 300 are mechanically robust, aerodynamically efficient, resistant to flame damage from uncontrolled burning, suitable for many types of manufacturing methods, including machining, casting, and additive manufacturing (AM), capable of a wide operating range while generating low levels of emissions of nitrogen oxides, carbon monoxide, and unburned hydrocarbons, capable of operation with a wide variety of gaseous fuels, and/or amenable to control using conventional methods and algorithms.

It will be understood that the benefits and advantages described above may relate to one embodiment or may relate to several embodiments. Aspects described in connection with one embodiment are intended to be applicable for use with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The preceding detailed description is merely exemplary in nature and is not intended to limit the invention or the application and uses of the invention. The described embodiments are not limited to usage in conjunction with a particular type of machine. Hence, although the present embodiments are, for convenience of explanation, depicted and described as being implemented in a gas turbine engine, it will be appreciated that it can be implemented in various other types of turbomachines and machines with fuel injection, and in various other systems and environments. In addition, although air nozzle 200 is described as defining a flow path for air, air nozzle 200 may define a flow path for other fluids, including other gases. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

What is claimed is:

1. A micromixer comprising:
a main body that includes an air nozzle defining a flow path through the main body along a first axis in a downstream direction, the air nozzle comprising an outlet portion having an outlet at a downstream end of the air nozzle;
a step extending from the main body along the first axis, the step comprising a surface that extends in the downstream direction from the outlet of the air nozzle and is parallel to the first axis; and
a fuel supply that includes a fuel chamber, extending into and terminating in the step, and at least one fuel jet that provides fluid communication between the fuel chamber and an area downstream of the outlet, and extends through the surface of the step at a location downstream of the outlet.

2. The micromixer of claim 1, wherein the air nozzle comprises:
an inlet portion that converges in the downstream direction; and
wherein the outlet portion is downstream from the inlet portion and diverges in the downstream direction.

3. The micromixer of claim 2, wherein the air nozzle further comprises a throat portion between the inlet portion and the outlet portion.

4. The micromixer of claim 1, wherein a cross-sectional area of the air nozzle, in a plane orthogonal to the first axis, decreases from an inlet of the air nozzle to the outlet of the air nozzle.

5. The micromixer of claim 1, wherein a cross-sectional profile of the air nozzle, in a plane orthogonal to the first axis, is circular for at least a portion of the air nozzle.

6. The micromixer of claim 1, wherein a cross-sectional profile of the air nozzle, in a plane orthogonal to the first axis, is rectangular for at least a portion of the air nozzle.

7. The micromixer of claim 1, further comprising one or more additional fuel jets which connect the fuel chamber to the flow path.

8. The micromixer of claim 1, wherein one of the at least one fuel jets is angled downstream, such that an end of the one fuel jet that is connected to the fuel chamber is upstream from an opposite end of the one fuel jet.

9. The micromixer of claim 1, further comprising a second fuel supply that includes a second fuel chamber and one or more second fuel jets that provide fluid communication between the second fuel chamber and the flow path.

10. The micromixer of claim 1, further comprising a turbulence-generating body at the outlet.

* * * * *